United States Patent [19]
Ito

[11] Patent Number: 5,470,121
[45] Date of Patent: Nov. 28, 1995

[54] SEAT SLIDING APPARATUS FOR VEHICLE AND A METHOD OF MAKING A SEAT SLIDING APPARATUS FOR A VEHICLE

[75] Inventor: Sadao Ito, Anjo, Japan

[73] Assignee: Aisin Seiki Kabushiki Kaisha, Japan

[21] Appl. No.: 288,880

[22] Filed: Aug. 10, 1994

Related U.S. Application Data

[63] Continuation of Ser. No. 14,572, Feb. 5, 1993, abandoned.

[30] Foreign Application Priority Data

Feb. 7, 1992 [JP] Japan .................................. 4-022593

[51] Int. Cl.⁶ .................................................. B60N 2/06
[52] U.S. Cl. .................................. 296/65.1; 248/430
[58] Field of Search .................................. 296/65.1, 68.1; 248/429, 430; 297/216

[56] References Cited

U.S. PATENT DOCUMENTS 3,450,425  6/1969  Leonhardt ........................... 248/430 X
4,711,493 12/1987  Schrom et al. ..................... 296/65.1 X
4,941,637  7/1990  Pipon ................................. 296/65.1 X
5,106,144  4/1992  Hayakawa et al. ................ 296/65.1 X
5,188,329  2/1993  Takahara ............................... 248/430

FOREIGN PATENT DOCUMENTS 62-123440  5/1987  Japan .

Primary Examiner—Dean Kramer
Attorney, Agent, or Firm—Finnegan, Henderson, Farabow, Garrett & Dunner

[57] ABSTRACT

A seat sliding apparatus for a vehicle is comprised of a pair of lower rails each of which is to be secured to a floor of a body of the vehicle, a pair of upper rails for supporting a seat-cushion which are slidably mounted on the respective lower rails, an auxiliary device interposed between each lower rail and the corresponding upper rail for assisting a movement thereof, and a stopper formed integrally with each of the upper rails so as to be brought into engagement with the auxiliary device when each of the upper rails move at a distance. An alminum extrusion manner is avilable for the formation of the stopper.

8 Claims, 2 Drawing Sheets

SEAT SLIDING APPARATUS FOR VEHICLE AND A METHOD OF MAKING A SEAT SLIDING APPARATUS FOR A VEHICLE

This application is a continuation, of application Ser. No. 08/014,572, filed Feb. 5, 1993, now abandoned.

BACKGROUND OF THE INVENTION

The present invention relates to a seat sliding apparatus for a vehicle, and in particular to a seat sliding apparatus including a pair of upper rails for supporting a seat-cushion are slidably mounted on a respective pair of lower rails to be secured to a floor of a vehicle-body, and a method of making such a seat sliding apparatus.

In a conventional seat sliding apparatus of the type which is disclosed in Japanese Utility Model Laid-open Print No.62(1987)-123440, a pair of lower rails are secured to a floor of a vehicle-body, and a pair of upper rails for supporting a seat-cushion are slidably mounted on the respective lower rails. Between each upper rail and the corresponding lower rail, an auxiliary sliding member is interposed for assisting the sliding movement of the upper rail. The upper rail is secured with a stopper which is in dependent therefrom per se, and an abutment of the stopper with the sliding member serves for the regulation of the sliding movement of the upper rail.

However, the stopper per se is separated from the upper rail, which leads to an increase of the number of parts and is cumbersome upon connection of the stopper to the upper rail.

SUMMARY OF THE INVENTION

It is, therefore, a principal object of the present invention to provide a seat sliding apparatus for a vehicle without the foregoing drawbacks.

It is another object of the present invention to provide a seat sliding apparatus for a vehicle in which a stopper is formed concurrently with the formation of an upper rail.

In order to attain the foregoing objects, according to the present invention, a seat sliding apparatus for a vehicle is comprised of a pair of lower rails each of which is to be secured to a floor of a body of the vehicle, a pair of upper rails for supporting a seat-cushion which are slidably mounted on the respective lower rails, an auxiliary device interposed between each lower rail and the corresponding upper rail for assisting a movement thereof, and a stopper formed integrally with each of the upper rails so as to be brought into engagement with the auxiliary device when each of the upper rails move at a distance.

BRIEF DESCRIPTION OF THE DRAWINGS

The above and other objects, features and advantages of the present invention will be more apparent and more readily appreciated from the following detailed description of the preferred exemplarily embodiment of the present invention, taken in connection with the accompanying drawings, in which.

DESCRIPTION OF THE PREFERRED EMBODIMENTS

Preferred embodiments of the present invention will be described hereinunder in detail with reference to the accompanying drawings.

Figure 1:
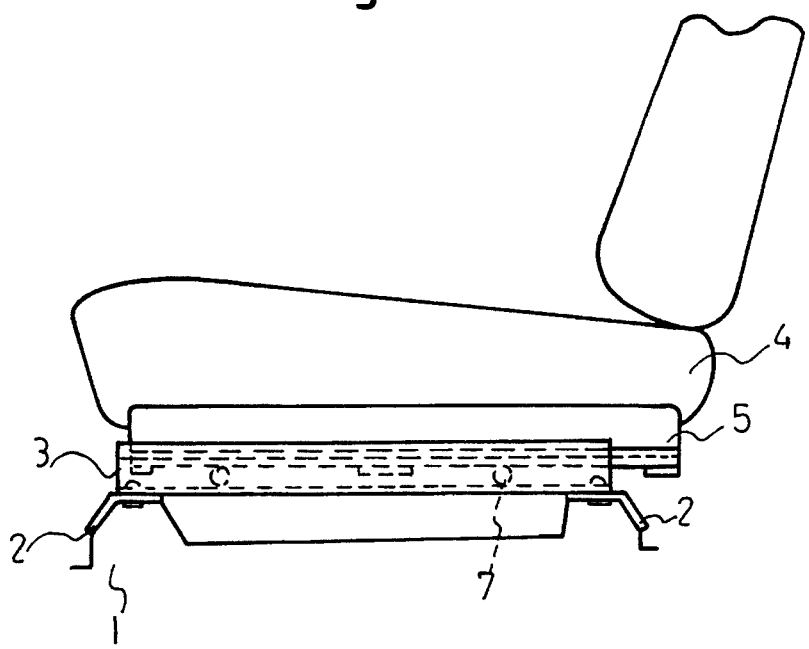
FIG. 1 is a side view of a first embodiment of a seat sliding apparatus according to the present invention.

Referring first to FIG. 1 a pair of lower rails 3 (only one is shown) are secured via a pair of respective brackets 2 (only one is shown) to a vehicle body floor 1. A pair of upper rails 5 (only one is shown) which support a seat-cushion 4 are slidably mounted on the respective lower rails 3.

Figure 2:
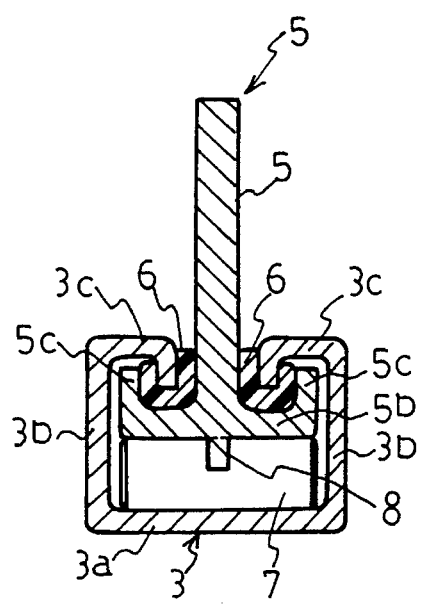
FIG. 2 is a cross-sectional view of the seat sliding apparatus in FIG. 1.

As shown in FIGS. 1 and 2, the lower rail 3 is of a substantial U-shaped configuration having a bottom wall 3a and a pair of opposed side walls 3b. A distal end 3c of each side wall 3b is bent into an L-shaped or hooked configuration and is terminated in being opposed to the bottom wall 3a. The upper rail 5 is formed into a substantial T-configuration having a main portion 5a which extends in the vertical direction, a supporting portion 5b which is perpendicular to the main portion 5a, a pair of flange portions 5c which are projected upwardly from opposite ends of the supporting portion 5b. The upper rail 5 is set to be positioned within the lower rail 3 in such a manner that the supporting portion is opposed to the distal end 3c of the lower rail 3 and the flange portion 5c is brought into an interlocked engagement with the distal end 3c of the lower rail 3 via a shoe 6. Thus, the upper rail 3 is slidably mounted on the lower rail 5. In addition, a plurality of rollers 7 are lengthwisely arranged between the supporting portion 5b of the upper rail 5 and the bottom wall 3a of the lower rail 5 in order to assist the sliding movement of the upper rail 5. It is to be noted that each of the upper rail 5 and the lower rail 3 is obtained by an aluminum extrusion manner as well known.

Figure 3:
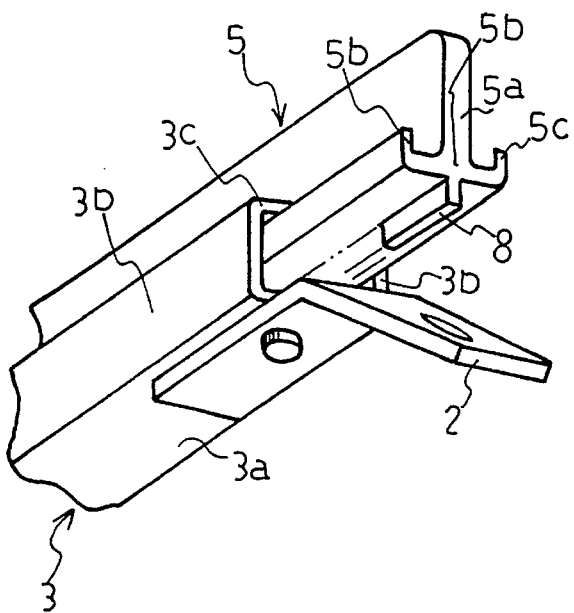
FIG. 3 is a perspective view, in part, of the seat sliding apparatus in FIG. 1.

As best illustrated in FIGS. 2 and 3, a stopper 8 is projected toward the bottom wall 3a of the lower rail 3 from an end of the supporting portion 5b of the upper rail 5. The stopper 8 is engageble with the roller 7 when the upper rail 5 slides at a stroke. The stopper 8 is formed integrally with the upper rail 5 during its extrusion. Though the length of the stopper 8 is equal to that of the upper rail 5 upon completion of the extrusion, the stopper 8 is set to be cut from the upper rail 5 in the light of the range within which the rollers 7 are arranged. Thus, the stopper 8 can be obtained concurrently with the preparation of the upper rail 5, which leads to the cost reduction, the elimination of the cumbersome assembly and reduction of the number of parts.

Figure 4:
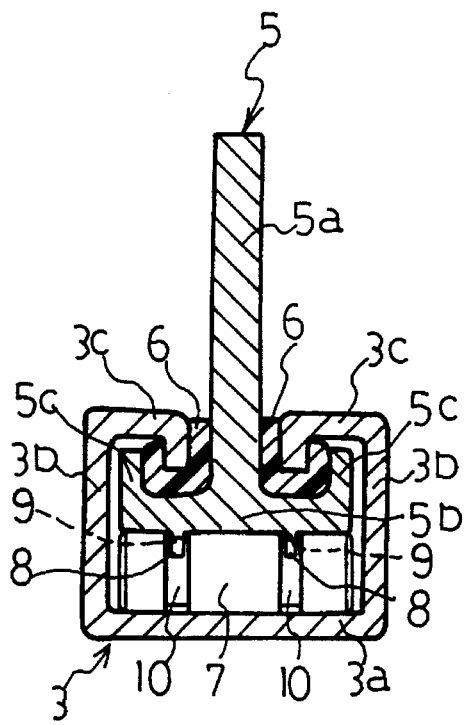
FIG. 4 is a cross-sectional view of the seat sliding apparatus of a second embodiment of a seat sliding apparatus according to the present invention.

Referring to FIG. 4, a pair of laterally spaced guide members 9 which are directed toward the roller 7 are formed at the supporting portion 5b of the upper rail 5 and the member 9 is in sliding engagement with an annular groove 10 of the roller 7. The stopper 8 is formed integrally with an end of the guide member 9 and is engageble with the groove 10.

Figure 5:
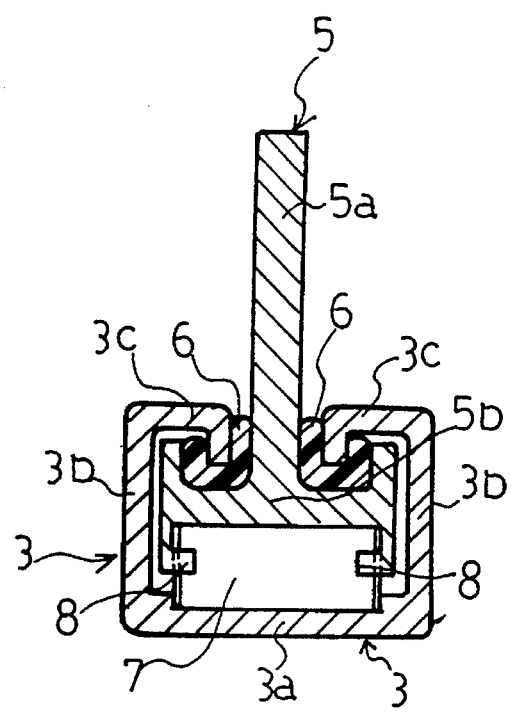
FIG. 5 is a cross-sectional view of the seat sliding apparatus of a third embodiment of a seat sliding apparatus according to the present invention.

Referring to FIG. 5, the stopper 8 is formed into a hooked configuration which is extended from each end of the supporting portion 5b of the upper rail 5.

Figure 6:
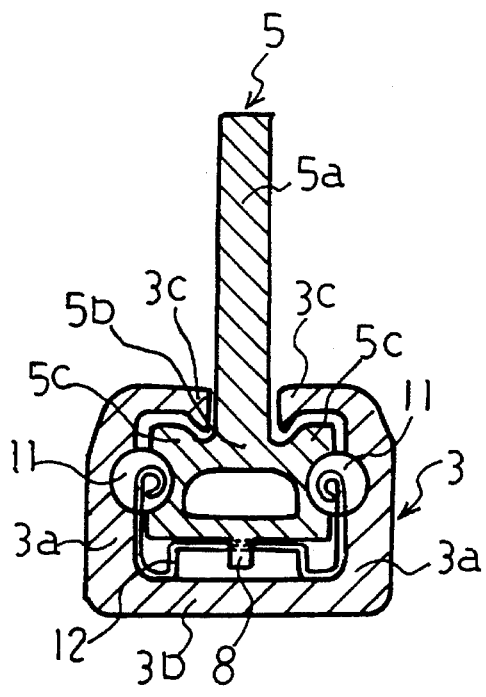
FIG. 6 is a cross-sectional view of the seat sliding apparatus of a fourth embodiment of a seat sliding apparatus according to the present invention.

Referring to FIG. 6, the stopper 8 is set to be engageble with a guide 12 which connects a pair of balls 11 to be an alternation of the roller 7.

Figure 7:
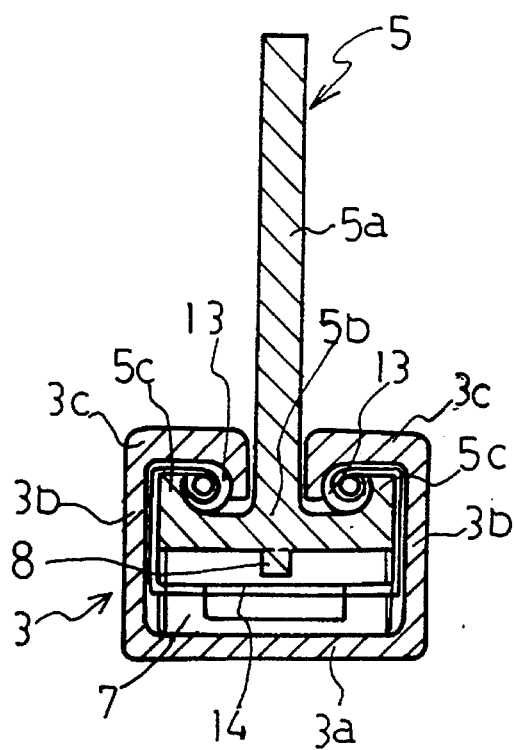
FIG. 7 is a cross-sectional view of the seat sliding apparatus of a fifth embodiment of a seat sliding apparatus according to the present invention.

Referring to FIG. 7, the stopper 8 is set to be engageble with a guide 14 which connects a pair of balls 13 to be an alternation of the shoe 6.

The invention has thus been shown and described with reference to reference to specific embodiments, however, it should be noted that the invention is in no way limited to the details of the illustrated structures but changes and modifications may be made without departing from the scope of the appended claims.

What is claimed is:

1. A vehicle seat sliding apparatus, comprising:

a lower rail attachable to a floor of a vehicle;

an elongated extruded upper rail for supporting a seat cushion, mounted for slidable movement along the lower rail, the upper rail being a unitary member and having a vertically extending main portion having a first length and a supporting portion extending substantially perpendicular to the main portion, the supporting portion having a bottom surface and first and second ends, and first and second vertically projecting segments extending from first and second portions of the bottom surface proximate the first and second ends, respectively, each vertically projecting segment extending along a second length of the bottom surface, the second length being less than the first length, and being substantially parallel with the main portion along its entire second length; and roller means positioned between the lower rail and the bottom surface of the upper rail for assisting the slidable movement and for stopping the slidable movement upon engagement with either the first or second projecting segment.

2. A vehicle seat sliding apparatus in accordance with claim 1, wherein the upper rail includes aluminum.

3. A vehicle seat sliding apparatus in accordance with claim 1, wherein the roller means includes a roller.

4. A vehicle seat sliding apparatus in accordance with claim 1, wherein the roller means includes a guide and a pair of balls suspended therefrom.

5. A vehicle seat sliding apparatus, comprising:

a lower rail attachable to a floor of a vehicle;

an elongated extruded upper rail for supporting a seat cushion, mounted for slidable movement along the lower rail, the upper rail being a unitary member and having a vertically extending main portion having a first length and a supporting portion extending substantially perpendicular to the main portion, the supporting portion having a bottom surface, first and second side portions, and first and second ends, at least one of the first and second side portions extending past the bottom surface to a distal end, and first and second projecting segments extending from first and second portions of the distal end of the at least one side portion proximate the first and second ends, respectively, each projecting segment extending along a second length along its entire second length less than the first length, substantially parallel with the supporting portion; and roller means positioned between the lower rail and the bottom surface of the upper rail for assisting the slidable movement and for stopping the slidable movement upon engagement with either the first or second projecting segment.

6. A vehicle seat sliding apparatus in accordance with claim 5, wherein the roller means includes a roller.

7. A vehicle seat sliding apparatus in accordance with claim 5, wherein the roller means includes a guide and a pair of balls suspended therefrom.

8. A vehicle seat sliding apparatus in accordance with claim 5, wherein the upper rail includes aluminum.

* * * * *